D. BLY.
Pump-Rod Attachments.
No. 147,093.                  Patented Feb. 3, 1874.
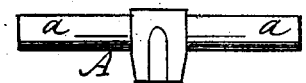
Witnesses
Fred H. Hatch
R. F. Osgood
Inventor:
Douglass Bly

UNITED STATES PATENT OFFICE.

DOUGLAS BLY, OF ROCHESTER, NEW YORK.

IMPROVEMENT IN PUMP-ROD ATTACHMENTS.

Specification forming part of Letters Patent No. 147,093, dated February 3, 1874; application filed August 18, 1873.

*To all whom it may concern:*

Be it known that I, DOUGLAS BLY, of the city of Rochester, in the county of Monroe and State of New York, have invented a certain new and useful Improvement in Pump-Rod Attachments; and I do hereby declare that the following is a full, clear, and exact description of the construction and operation of the same.

This improvement relates to that class of pump-rod attachments which connect the pump or piston rod with the working-beam in deep wells, and allow a vertical adjustment of said rod. The invention consists in the construction and arrangement of the clamping-head, as hereinafter described.

In the drawings, Figure 1 is a front elevation. Fig. 2 is a side elevation. Figs. 3 and 4 are detail views.

A represents the cross-head, or that portion of the device which is connected with the working-beam. It has two journals or bearings, *a a*, which rest in suitable boxes of the working-beam, so that when the latter moves up and down, the journals turn to allow the attachment to preserve its proper position to the pump-rod. B represents the clamping-head, to which the pump-rod C is secured. The clamping-head consists of a block, *b*, in the face of which is formed a longitudinal groove, *p*, which receives one side of the pump-rod. There is a follower or clamp, *c*, which is also formed with a groove, *p*, which receives the other side of the pump-rod. This follower or clamp may be made separate or firmly attached to the eyebolt G. The contiguous faces of the block and the follower do not quite meet, but leave a little space between to insure the proper pressure of the follower upon the pump-rod. The follower is drawn up against the block by means of the eyebolt G, which embraces the former, and has a bolt, *d*, which passes through a hole, *f*, of the block, on which bolt screws a nut, *g*. The hole *f*, where the head of the eyebolt rests, is made enlarged, so that the head will draw in properly to tighten the parts.

When the pump-rod is removed for the purpose of renewing the cups or valves, the nut on the eyebolt is removed, the follower withdrawn, (when made separate from the eyebolt,) and the eyebolt allowed to remain on the rod, which allows a quick and easy attachment and detachment of the pump-rod.

D is the rod, which forms the body of the device, and connects the cross-head with the clamping-head. I prefer to make this rod from a solid iron bar of proper size and length; but, if desired, the body or connection may be of other form, and may either be formed separate or cast with the cross-head and clamping-head. In the latter case a right angle or + is very strong and effective.

When a solid rod is used, as shown in the drawings, I prefer to cast one or both ends into one or both of the parts A B, which is done by first nicking or indenting the end with a hammer or otherwise, then placing the end of the rod into the mold, and pouring the melted iron therein. The iron, flowing around the end of the rod, and settling into the nicks or indentations, secures the rod fast in place when cold.

The rod D may be of any length to suit the convenience of the operator.

The advantage in the arrangement of the clamping-head, as herein described, is that a clamping-surface of considerable extent is secured, and the pump-rod held straight and firm in the grooves, while but a single eyebolt is required to draw the follower to the block.

This form of the clamping arrangement also prevents breakage and strain, by holding on the pump-rod a considerable length, and this form is particularly adapted to deep wells, where great power is required.

Having thus described my invention, what I claim as new, and desire to secure by Letters Patent, is—

The clamping-head consisting of the block *b* and follower *c*, provided with the coincident grooves *p p* for holding the pump-rod, and secured together by the eyebolt G, the whole combined and arranged to operate in the manner and for the purpose specified.

In witness whereof I have hereunto signed my name in the presence of two subscribing witnesses.

DOUGLAS BLY.

Witnesses:
   FRED. A. HATCH,
   R. F. OSGOOD.